United States Patent
Hobmeyr et al.

(10) Patent No.: US 7,354,669 B2
(45) Date of Patent: Apr. 8, 2008

(54) OPERATION METHOD AND PURGING SYSTEM FOR A HYDROGEN DEMAND/DELIVERY UNIT IN A FUEL CELL SYSTEM

(75) Inventors: Ralph T. J. Hobmeyr, Mainz-Kastel (DE); Dirk M. Wexel, Mainz-Kastel (DE)

(73) Assignee: General Motors Corporation, Detroit, MI (US)

( * ) Notice: Subject to any disclaimer, the term of this patent is extended or adjusted under 35 U.S.C. 154(b) by 554 days.

(21) Appl. No.: 10/771,171

(22) Filed: Feb. 3, 2004

(65) Prior Publication Data

US 2004/0219401 A1    Nov. 4, 2004

(30) Foreign Application Priority Data

Apr. 1, 2003  (DE)  ................. 103 14 820

(51) Int. Cl.
*H01M 8/00*   (2006.01)
*H01M 8/04*   (2006.01)

(52) U.S. Cl. .............................. 429/13; 429/17; 429/22

(58) Field of Classification Search .................. 429/13, 429/17, 22
See application file for complete search history.

(56) References Cited

U.S. PATENT DOCUMENTS 5,045,414 A    9/1991  Bushnell et al. .............. 429/17
5,366,818 A *  11/1994 Wilkinson et al. ............ 429/13
2002/0076583 A1* 6/2002 Reiser et al. .................. 429/13
2003/0039870 A1   2/2003 Busenbender ................ 429/13

FOREIGN PATENT DOCUMENTS

| DE | 10130095 | 3/2002 |
| DE | 10063254 | 7/2002 |
| DE | 10115336 | 10/2002 |
| DE | 10128836 | 12/2002 |
| DE | 10161521 | 12/2002 |
| DE | 10146943 | 4/2003 |
| DE | 10257212 A1 | 6/2004 |
| JP | 200-315514 | * 11/2000 |
| JP | 2003-203665 | * 7/2003 |
| WO | WO 01/97311 A2 | 12/2001 |

* cited by examiner

*Primary Examiner*—Tracy Dove
*Assistant Examiner*—Helen Chu

(57) ABSTRACT

The invention pertains to a process for preventing the freezing of water in a structural component containing at least one moving part in the anode cycle of a fuel cell system, characterized by the fact that at the time of a switching-off process the structural component is scavenged by a dry scavenging gas in order to remove a quantity of water present there.

28 Claims, 5 Drawing Sheets

OPERATION METHOD AND PURGING SYSTEM FOR A HYDROGEN DEMAND/DELIVERY UNIT IN A FUEL CELL SYSTEM

BACKGROUND OF THE INVENTION

The present invention pertains to a process for preventing the freezing of water in a structural component of a fuel cell system, especially in a component containing at least one movable part in the anode cycle of a fuel cell system as well as a fuel cell system with several fuel cells combined to form a fuel cell stack which has an anode side, a cathode side and a membrane arranged between the anode side and the cathode side, the anode sides of the fuel cells being joined together to form an anode cycle and which also includes a device for supplying fresh gaseous fuel, a drain valve which is designed for continuous or discontinuous bleeding off of at least part of the gases flowing in the anode cycle and at least one component having a moving part such as a fuel recirculation pump, the fuel recirculation pump feeding the exhaust gases emerging from the anode sides of the fuel cell and containing useful fuel back to the anode sides of the fuel cells.

SUMMARY OF THE INVENTION

In the anode cycle of a low-temperature fuel cell system, especially in so-called PEM fuel cells which are fed with gaseous hydrogen or a hydrogen-rich synthetic gas as fuel, water accumulates in the form of moisture or condensate. This water is formed during the catalytically promoted reaction of protons supplied by the hydrogen, which diffuse through the membrane of the fuel cells, with the air oxygen which is supplied to the cathode sides of the fuel cells, i.e. in the process which is also responsible for the desired generation of current. The water generated on the cathode sides of the fuel cells moistens in a desirable way the membranes of the fuel cells, and part of the water diffuses, together with nitrogen from the fed-in air, through the membrane and in this way passes over to the anode side of the fuel cells. In many fuel cell systems, in addition, water is fed directly to the anode sides of the fuel cells by moistening the fuel in order to assure the desired relative humidity in the anode cycle. The water present in the anode cycle which is partly present in the form of vapor and partly in liquid form freezes at ambient temperatures below 0° C. and can prevent the operation of or damage certain components such as, e.g., a recirculation pump provided for the recirculation of hydrogen or a water separator provided in the anode cycle. Similar problems can also arise elsewhere in a fuel cell system, for example, in a water separator in the cathode cycle of the fuel cell system. The process according to the invention can therefore also be utilized there.

The functioning principle of the presently used recirculation pumps, which are ordinarily designed as side channel compressors or as turbocompressors, requires narrow gaps and tolerances in order to seal and produce efficient conveying. These are functionally related and cannot be avoided. Since the recirculation pump used has the task of conveying hydrogen-containing gases in order to achieve a pressure increase in the pump, said pump must be sealed against the outside in order to avoid undesired escape of hydrogen. The necessary sealing to the outside can be achieved, but it is scarcely possible to seal, for example, the motor of the recirculation pump with respect to the pump itself since the hydrogen-containing gases are capable of penetrating even through the smallest gaps. As a result the condensate collects in the gaps of the motor, the bearings and in the low points of the recirculation pumps, and when it freezes it blocks the conveying unit of the recirculation pump. This physical phenomenon cannot be avoided because it is related to the system. The generation of water vapor during the operation of a PEM fuel cell is inevitable and the water vapor always generated in the system under suitable temperature conditions necessarily leads to the systematic accumulation of condensate.

The objective of the invention is to devise a process or a fuel cell system of the type mentioned initially in which the harmful effects of the accumulating condensate at temperatures below the freezing point can be avoided.

To solve this problem according to the invention a process of the type mentioned initially is envisaged which is characterized by the fact that during or after a switching-off process the component is flushed with a dry scavenging gas in order to remove the quantity of water present there.

In a fuel cell system of the type mentioned initially this problem can be solved by providing a scavenging gas inlet in the anode cycle which is arranged so as to supply the component with dry scavenging gas, and this gas is sent through the spaces present there especially those with a moving part which is at risk of freezing in order to expel and/or dry off the water present there.

According to the invention, therefore when a fuel cell system is switched off the condensate present in the component and the moisture accumulated there is removed by a dry scavenging gas from the component and preferably from the entire anode cycle. The removal is generally accomplished in two ways. On the one hand the pulse of dry scavenging gas is used to drive liquid water out of the system as much as possible in the sense of water displacement, while the moisture still present is evaporated by a drying process performed by the dry scavenging gas and is also removed as an exhaust gas stream from the component and preferably from the anode cycle. This procedure is more efficient than evaporating all of the water present by the dry scavenging gas, although the latter is also basically possible.

If it is said that the scavenging process takes place at the time of a switching off process, then this expresses the fact that the operator or driver of a vehicle containing the fuel cell system has decided to switch off or stop his vehicle and the control system belonging to the fuel cell system has initiated the switching off of the system. This switching off process can include, for example, a transition time in which the hydrogen still present in the anode cycle in the fuel cell stack is consumed and for this purpose air is still supplied to the cathode side of the fuel cells in order to break down the excess hydrogen on the anode side. The switching off of the system, however, instead of this can also include or be simultaneous with a transition time during which the excess hydrogen is fed directly to an external catalytic converter or to the cathode side of the fuel cells as is described in the German patent application 101 153 36.8. The drying process utilizing dry scavenging gas can be carried out during this switching off phase of the fuel cell stack, i.e. during the transition time or only after the completion of the switching off phase, possibly somewhat later.

It is not absolutely necessary to remove all water displaced from the component or moisture transferred by a drying process into the vapor phase from the anode cycle of the fuel cell system. This is indeed possible in principle but requires a larger quantity of the scavenging gas and energy. Instead, for example, it is possible to absorb the remaining quantity of water or water vapor in a coating of the anode cycle, as is described, for example, in the German patent application 100 63 254.8.

In order to utilize the dry scavenging gas efficiently, according to the invention, it is advantageous to estimate the quantity of water still present in the anode cycle when switching off the fuel cell system and only to use the necessary quantity of dry scavenging gas for expelling or drying out the quantity of water vapor present. This represents an economical procedure.

The quantity of water which is still present in the anode cycle or in the component can be estimated by the control system of the fuel cell system. For example, the German patent application 101 46 943.8 describes how a fuel cell system can be economically controlled. An integral component of the control system is the calculation of the relative humidity present in each case. In addition a moisture sensor can be provided in the anode cycle which measures the relative humidity present. It is then only necessary to perform a scavenging with dry scavenging gas if ambient temperatures are expected which make the freezing of the water appear possible, i.e., over a time which extends up to the next switching on of the fuel cell system. At ambient temperatures which lie clearly above freezing point of water during this time interval the scavenging process with dry scavenging gas need not be performed and is preferably not performed in order not to unnecessarily consume energy or scavenging gas.

However, if temperatures in the freezing range are expected, then it is necessary to scavenge. For this purpose a device of the scavenging system is envisaged which calculates the quantity of scavenging gas and the duration of the scavenging process according to the quantity of water present in the component or in the entire anode cycle in order to drive the water present out of the component or remove it from the component by drying.

It is especially favorable if the process is only carried out when the ambient temperature and/or the historical curve of the ambient temperature and/or the anticipated curve of the ambient temperature make it apparent that freezing up of the system is possible during the time interval following the switch-off.

In this case the time interval to be considered can, for example, be input by the driver or can be set in advance.

It is especially favorable and simple if an external signal announces the possible freezing of the system within a following time interval determined in advance. In the simplest case an ambient temperature-measuring sensor can be provided, and when the temperature drops below this value of, e.g., 3° C. a scavenging process is performed, i.e. even long after the fuel cell system is switched off. In addition it can be conceived that as fuel-cell powered vehicles become more common a meteorological service might regularly broadcast signals to be received by a receiver belonging to a fuel cell system and considered by the control unit.

Such signals can contain location-dependant temperature predictions which are processed by the control system of the fuel cell system as a function of the location. That is, the signals is capable of distinguishing, for example, between warm regions such as Florida and cold regions such as in the Rocky Mountains. The location of the fuel cell system in each case can be determined by a GPS system which is also connected to the control system.

It can be advantageous to conduct a process which is characterized by the fact that the quantity of scavenging gas and/or the duration of the scavenging with dry scavenging gas is selected so as to drive part of the quantity of water present that can be collected, e.g., by a collecting process, out of the anode cycle and in order to remove from the anode cycle a second partial quantity of water by a drying process.

If the component is so designed that the liquid water present there collects in a region determined in advance then the removal of the liquid water from this region can be accomplished relatively simply and economically, e.g., by having the scavenging gas drive all of the liquid water present in this region out of it. For example, a drain valve can be provided in the immediate proximity of this region which is opened by the control system at the time of the scavenging process in order to drive the collected water out of the system. In this way then only a small residual quantity of water vapor would remain which is removed from the system by a drying process. Here also the dry scavenging gas is used economically.

Various possibilities exist for making the dry scavenging gas available. For example, it can be compressed air which is produced by a compressor or by an auxiliary compressor intended to deliver compressed air to the cathode side of the fuel cell system. Either part of the compressed air delivered by the air compressor is tapped off at the time when the fuel cell system is switched off and used for the scavenging process, possibly after a corresponding drying, or for the case when the scavenging process is performed only after the fuel cell system is switched off, the air compressor can be switched on additionally for this purpose. This need not necessarily involve the main air compressor but rather an accessory compressor which is intended for the starting process, for example, corresponding to German patent application 101 30 095.6. That is, this auxiliary compressor could also be used for the purpose of scavenging.

As an alternative to this setup, fresh fuel can be used as dry scavenging gas. For example, if hydrogen is provided as the fuel, then said hydrogen is ordinarily present in dry form, then the fuel could also be used for carrying out the scavenging process.

Another alternative is to use a dry inert gas or a mixture of inert gases for the scavenging process. In this case the inert gas or the mixture of inert gases is selected from the group consisting of argon, nitrogen and helium. Such inert gases must then be carried in their own supply container along with the fuel cell system.

The component is preferably either a side channel compressor or a turbocompressor since both types of compressors can exist in an air-cooled or liquid-cooled form. Other types of pumps can also be used according to the invention.

The scavenging gas at any rate must be dry, behave inertly with respect to the materials in the anode cycle of the fuel cell system and cannot represent a safety risk when mixed with hydrogen. The use of air as a scavenging gas has the advantage that it is present in the environment in an unlimited quantity. Hydrogen is conveyed anyway as a propellant with the vehicle containing the fuel cell system and inert gases such as $N_2$, argon or helium can easily be conveyed in small quantities. Since these gases also occur in the air, they are suitable as scavenging gases since they do not cause air pollution.

Preferred modifications of the processes according to the invention for a fuel cell system according to the invention can be derived from the subordinate claims and the description below. Examples of embodiment of the invention will be described with reference to the drawings.

DESCRIPTION OF THE PREFERRED EMBODIMENT

Figure 1:
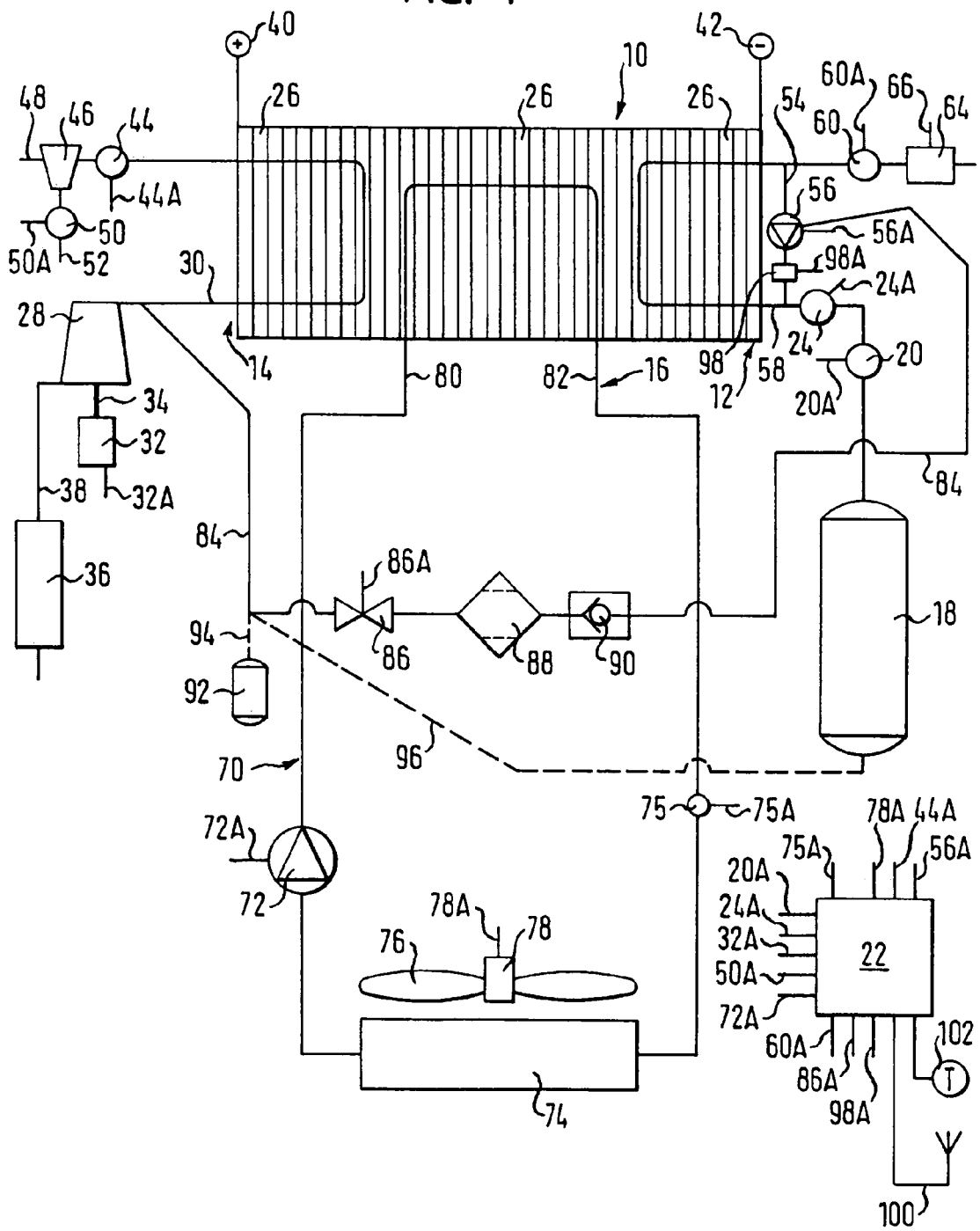
FIG. 1 shows a schematic representation of a fuel cell system.

FIG. 1 shows a schematic representation of a fuel cell system consisting of a fuel cell stack 10 with an anode side 12 and a cathode side 14. The fuel cell system also has a coolant cycle 16 which is filled with an insulating coolant which, depending on where the fuel cell system is operated, does not freeze at the maximally anticipated negative temperatures there, i.e. does not pass into the solid state. Instead of using a coolant in liquid form the fuel cell system can also be provided with air cooling.

On the anode side 12, a fuel such as hydrogen-rich synthetic gas is stored in a low-temperature storage container 18 or in another suitable pressurized container. The reference number 20 denotes a valve which serves to reduce the pressure in the storage container 18 to a lower feed pressure. The valve 20 is governed by a control unit 22 through conduit 20A. In order to simplify the representation the curve of the control conduit 20A between the valve 20 and the control 22 is not shown, but it is understood that the tap line 20A on the valve 20 is connected to the tap line 20A on the control 22. This is also true for all other tap conduits which are indicated in FIG. 1, i.e. all tap conduit lines which lead to a component in the drawing are provided with the same reference numbers as the component itself but with the suffix "A" and accordingly the tap line on the control 22 is identified by the corresponding reference number.

On the anode side 12, the fuel or hydrogen is passed on from the pressure reducing valve to a control valve 24 which is connected via a tap line 24A to control 22, the control 22 serving to set the valve 24 so that the necessary quantity of fresh hydrogen or fuel is supplied to the anode side 12 of the fuel cell system. The hydrogen or fuel supplied to the fuel cell system delivers protons to the individual fuel cell cells 26 of the fuel cell stack 10, and these protons migrate there through the membranes provided (not shown) to the cathode side 14.

By conventional means the cathode side 14 is supplied with air oxygen through compressor 28 and conduit 30. The air compressor 28 is driven by an electric motor 32 via a shaft 34 and draws air through the air filter and noise muffler 36 and conduit 38. Electric motor 32 has electrical connections (not shown) as well as a control line 32A which is connected to the control 22. The protons which diffuse through the membranes of the individual fuel cells 26 react on the cathode side 14 of the fuel cell stack 10 with the oxygen molecules which are delivered by the compressor 28 and by this reaction generate water vapor and electrical power which is tapped off at the terminals 40 and 42 of the fuel cell stack. This electric power is used when the fuel cell system is used in a car to supply the electric motors which drive the individual wheels of the vehicle. Part of the electric power can also be used for other purposes, e.g., to drive the electric motor 32. The reference number 44 denotes a valve on the cathode side 14 of the fuel cell system which governs the operating pressure on the cathode side. In order to be able to regulate valve 44 the latter has a control line 44A which is also connected to the control 22. The cathode-side exhaust gases which consist primarily of unconsumed air oxygen, water vapor, nitrogen and water droplets can be discharged directly to atmosphere without harm since these exhaust gases are natural components of air. Ordinarily the water droplets, however, are collected in a water separating device 46 before the remaining exhaust gases are discharged to atmosphere through conduit 48.

The reference number 50 denotes a valve which can be operated via the tap line 50A in order to drain the collected water through the conduit 52 or to feed it to another application.

On the anode side 12 of the fuel cell stack 10 is a return flow line 54 which leads via recirculation pump 56 to the anode inlet 58. In this way the anode exhaust gases consisting primarily of unburnt hydrogen, nitrogen and water vapor can be guided back through the fuel cell stack so that better utilization of the supplied hydrogen can be achieved. The rotation speed of the pump 56 and therefore its conveying capacity can be determined via the conduit 56A by the control 22. The reference symbol 60 denotes a drain valve which can be governed via conduit 60A, which can be modulated discontinuously or continuously in order to remove part of the anode-side exhaust gases from the anode cycle. Since these gases still contain hydrogen and since the hydrogen cannot be discharged unobjectionably to atmosphere, the discharged anode-side exhaust gases are guided through a burner 64, usually a catalytic burner, which receives oxygen through conduit 66 and thereby assures that the hydrogen and oxygen come together to form water which can be released harmlessly. If desired, at least part of this water can be collected in a water separating device.

The remaining cathode exhaust gases, i.e. water vapor, water droplets and nitrogen can in turn be discharged unobjectionably to atmosphere since they are natural components of ambient air. Nitrogen contained in the anode exhaust gases is therefore to be found on the anode side, because it diffuses through the membrane of the fuel cell to the anode side as does the water generated and present on the cathode side.

The coolant cycle 16 consists of a main cycle 70 which contains a pump 72, a cooler 74 and a temperature sensor 75. The temperature sensor 75 is connected to the control via conduit 75A.

In the representation shown in FIG. 1 the pump 72 draws coolant into the return flow line 80 of the main cycle 70 and conveys it in operation through cooler 74 and subsequently through the forward flow line 82 back to the fuel cell stack 10. The reference number 76 denotes a cooling blower which is driven by the electric motor 78 which in turn receives electrical power from the fuel cell system via conduits not shown, i.e. part of the electrical power received from the terminals 40 and 42. The electric motor 78 is governed additionally via control conduit 78A by control 22 in its rotation speed. By controlling the rotation speed of the pump 72 through the control line 72A and controlling the rpm of the electric motor 78 and therefore of the air blower 76 via the control line 78A the desired cooling capacity of the main cycle 70 can be determined by the control 22.

The above-described fuel cell system is already well known, and numerous possible modifications exist, which are not important here since they have nothing to do with the present invention.

It need only be pointed out that the individual fuel cells consist of so-called membrane-electrode units (MEA) which are arranged between two bipolar plates. The bipolar plates which are frequently designed as two plates placed flatly against each other have cooling channels in their interior through which the coolant circulates in order to maintain the individual fuel cells in the desired operating temperature range. The design of the fuel cells and the cooling channels provided inside the bipolar plates is well known, among others from numerous patents such as DE 101 28 836 A1 and will therefore not be described further.

From FIG. 1 it is apparent that the conduit 84 leads from conduit 30 at the outlet of the air compressor 28 to the recirculation pump 56. This conduit serves to flush the recirculation pump and finally also the entire anode cycle with dry compressed air. For this purpose an adjustable closable valve 86, an air dryer 88 and a check valve 90 are installed in the conduit 84. The closable and adjustable valve 86 is connected to control 22 via a control line 86A.

Instead of tapping off scavenging gas from conduit 30 in the form of compressed air, the possibility also exists of supplying an inert gas or a mixture of inert gases to the recirculation pump 56. For this purpose as an alternative in FIG. 1 a pressure storage unit 92 for the inert gas or the mixture of inert gases is provided, which can be selected, for example, from $N_2$, Ar, He, and leads via a tap line 94 to the inlet of the adjustable closable valve 86. As another alternative the possibility exists of using dry fuel, i.e. dry hydrogen from the storage container 18 as the scavenging gas. For this purpose the fuel storage unit 18 is connected via conduit 96 to the closable and adjustable valve 86. If necessary also a pressure reducing valve can be installed in the conduit 96, or the conduit 96 can be connected to the downstream side of the pressure reducing valve 20 on the corresponding fuel line. It goes without saying that usually only one of the three possibilities for flushing the recirculation pump is used, i.e. when conduit 94 or 96 is used the piece of the conduit between valve 86 and pressure conduit 30 is absent.

Also in FIG. 1 immediately adjacent to the recirculation pump 56 a moisture sensor 98 is provided which is connected through conduit 98A to control 22. Through this conduit the control 22 receives information concerning the relative humidity in the anode cycle and is therefore capable of determining at any time, with consideration of the corresponding volumes, the quantity of moisture in the recirculation pump 56 or in the anode cycle, in which case the moisture sensor 98 can also be used for the operation of the fuel cell system, e.g., as described in German patent application 101 46 943.8.

FIG. 1 also shows an external temperature sensor 102 which is also connected to the control 22 and also optionally an antenna 100 which is designed to receive meteorological signals and is also connected to the control 22.

Figure 2:
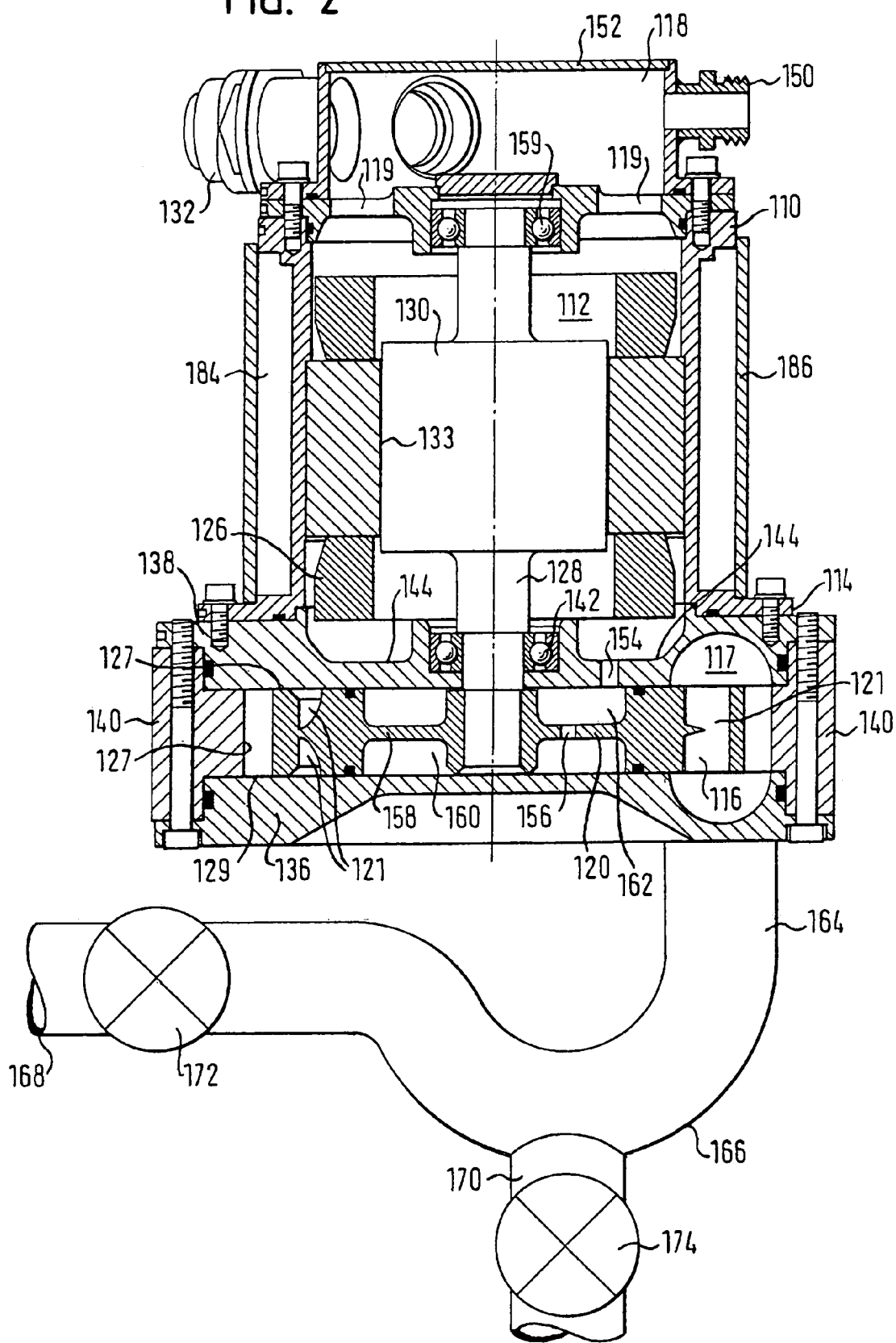
FIG. 2 is a longitudinal section through the side channel compressor according to the invention which is suitable as a recirculation pump and has a scavenging gas inlet.
Figure 3:
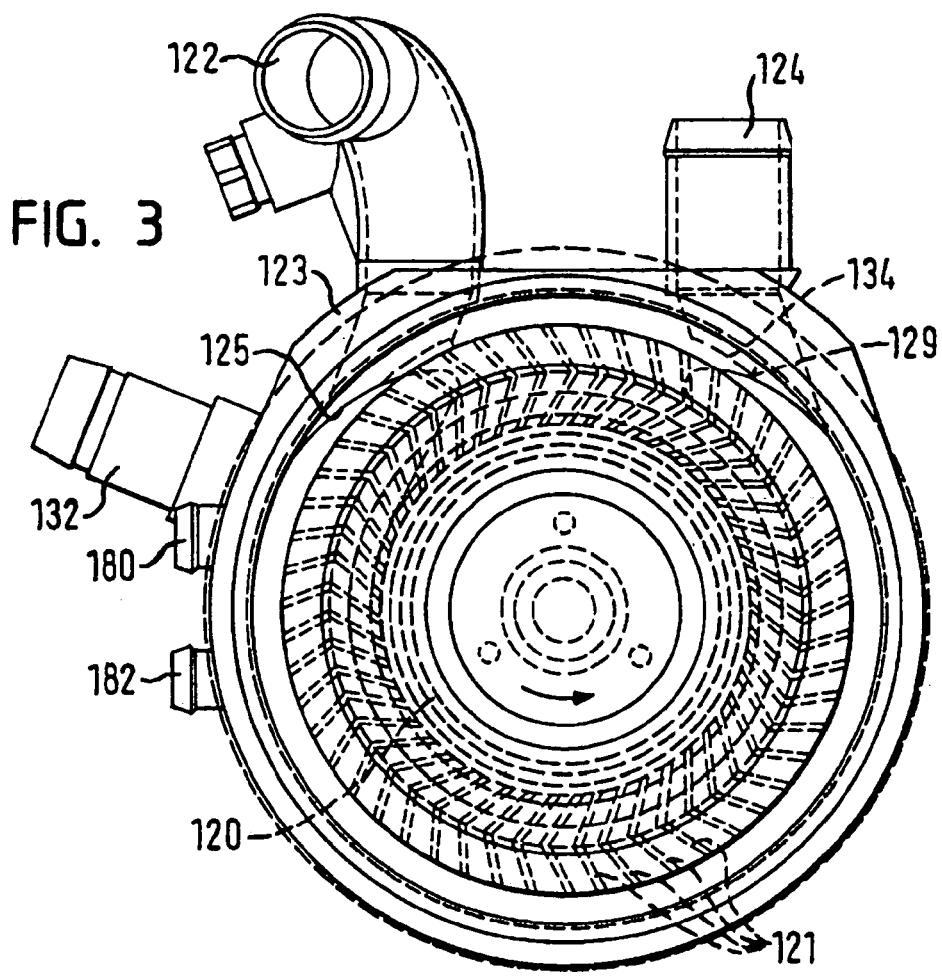
FIG. 3 is a view from below of the rotor of the side channel compressor.

Now a construction design of a recirculation pump 56 will be described in detail in the form of a so-called side channel compressor which is shown in FIGS. 2 and 3.

The basic design of a side channel compressor is well known. The side channel compressor 56 has a motor space 112 arranged inside a housing 110, a conveyer space 116 arranged at the lower end 114 of the housing and a space for connections 118 arranged at the other end of the housing, the conveyer space 116 containing a rotor wheel 120 which draws gaseous fuel through a tubular inlet 122 (which is tightly welded around the housing part 123) in cooperation with the side channel 117, causing a pressure increase in the gaseous fuel and delivering it subsequently through an outlet 124 to the anode sides of the fuel cells. In the motor space 112 a stator 126 is arranged in the housing as well as a rotor 130 arranged on a drive shaft 128, the drive shaft 128 driving the rotor 120, and in the connections space 118 electrical connections (not shown) and possibly the controller (also not shown) for the stator 126 and rotor 130 comprising the motor etc.

The electrical connections to the stator are not shown in FIG. 2, but the current supply is guided via a plug connection 132 to the stator windings. This plug connection is designed as a so-called mil plug and represents a hermetic seal between the inner space of the side channel compressor and the outer environment. The exact details of the motor will not be described here since they do not belong to the invention. It is to be understood, however, that the electric motor can be designed according to any conventional design.

Conditioned by the system a pump such as the side channel compressor 56 shown in FIGS. 2 and 3 has small gaps between different components. For example between rotor 130 and stator 126 a small air gap 133 is present which should well be kept small in order to achieve a high efficiency of the motor. This means that the rotor 130 is seated closely fitting in the stator packet of the stator 126.

Also the rotor wheel 120 with blades 121 fits closely with the outlet channel 134 of the outlet 124, with the inlet channel of the inlet 122 and the adjacent covers 136 and 138 which bound the spacer ring 40 of the conveyer space 116 so that at these places other narrow functional gaps 123, 125, 127, 140, 149 and 151 are present between the stationary parts and the moving parts, here the rotor 120. As a result of this construction in the lid or cover 136 around the bearing 142 a groove 144 is formed below the motor. Because of this groove water collects in the motor space. In addition condensate and the liquid water which appears upon the switching off of the motor remain in narrow gaps envisioned or addressed above.

The design of the side channel compressor 56 as described heretofore corresponds to the previously known design of a side channel compressor. According to the invention, however, this structure is modified by providing a scavenging gas inlet 150 in the lid 152 which is adjacent to the space for connections 118 and seals it against the outer environment. The scavenging gas delivered through conduit 84 is fed in through the scavenging gas inlet 150 into the connections space. In addition a boring 154 is provided in the bearing lid 138 and another boring 156 in the cross member 158 of the rotor 120 so that the scavenging gas can penetrate into the cavities on both sides of the cross piece and from here can flush out the functional gaps in the region of the rotor.

When the fuel cell system is switched off the scavenging gas is fed through the scavenging gas inlet into the connections space, drives out or evaporates any condensate there or on or in a possibly present controller through the borings 119 into the motor space 112 and then flows through the motor so that the functional gap 133 between the rotor and the stator is scavenged. Any water droplets present there are driven out of the region of the motor into the groove 144. Scavenging gas also has the result that any water and water vapor present in the region of the groove 144 are subsequently displaced through the boring 154 in the bearing lid 136 and through the boring lid 156 in the rotor 120 into the hollow spaces 160, 162 on both sides of the cross piece 158 of the rotor and from there through the narrow functional gaps above and below the rotor 120 further into the conveyer space 116 of the compressor so that the water vapor and liquid water can subsequently leave the conveyer space through the outlet channel 134 and through the outlet 124 the side channel compressor. Therefore all water or water vapor is driven out of the side channel compressor or evaporated through an evaporation process which is also accomplished by the scavenging gas and expelled so that no moisture remains in the side channel compressor that could lead to the freezing up of the side channel compressor at negative temperatures.

The water or water vapor is then removed completely from the anode cycle by means of the scavenging gas via the anode cycle and the drain valve 60. As stated above, this is not absolutely necessary if the anode cycle is provided with a water-absorbing coating which serves to absorb the water out of the side channel compressor 56.

FIG. 2 shows a possible modification of the side channel compressor. Here, in other words, at the fuel outlet 124 a pipe 164 with an bend at 166 is mounted whose open end 168 leads to the fuel inlet 58 or to the conduit between the valve 24 and the fuel inlet 58. A drain line 178 leads from the lower part of the U bend by the lower route. A first valve 172 is inserted into the pipe 164 after the curve 166 while a second valve 174 is positioned in the drain line 170.

When the scavenging process is carried out the valve 172 is first opened and the valve 174 closed. The liquid water collects, when the flow velocity is correctly chosen, essentially in the U curve which can be designed with a sufficiently large-dimensioned water holding capacity. Then at least briefly the valve 172 is closed and the valve 174 opened so that the collected water can be forced out of the drain line 170 and thus need not be first driven through the entire anode cycle and also need not be dried out by supplying scavenging gas.

Additionally, it should be pointed out that the side channel compressor according to FIGS. 2 and 3 has a water cooling system. The inlet 180 and the outlet 182 for the cooling water are shown in FIG. 3, the cooling water flows into the annular space 184 which extends around the motor housing and is formed by the outer contour of the housing 110 and the annular sleeve 186.

FIGS. 2 and 3 additionally show how the side channel compressor is constructed, i.e. where the bearings and gaskets as well as the screws are seated which connect the individual parts of the housing and lids to each other and to the other components.

Instead of water cooling, it is also quite conceivable to provide the side channel compressor with air cooling which in the simplest case can be achieved by providing the housing 110 in the region of the annular space 184 where the water cooling is shown in FIG. 2 with ring-shaped ribs (e.g., like the turbocompressor of FIG. 5), in which case the jacket 186 is omitted. If necessary a cooling blower or another cooling airstream can be used in order to carry heat away from the side channel compressor.

Figure 4:
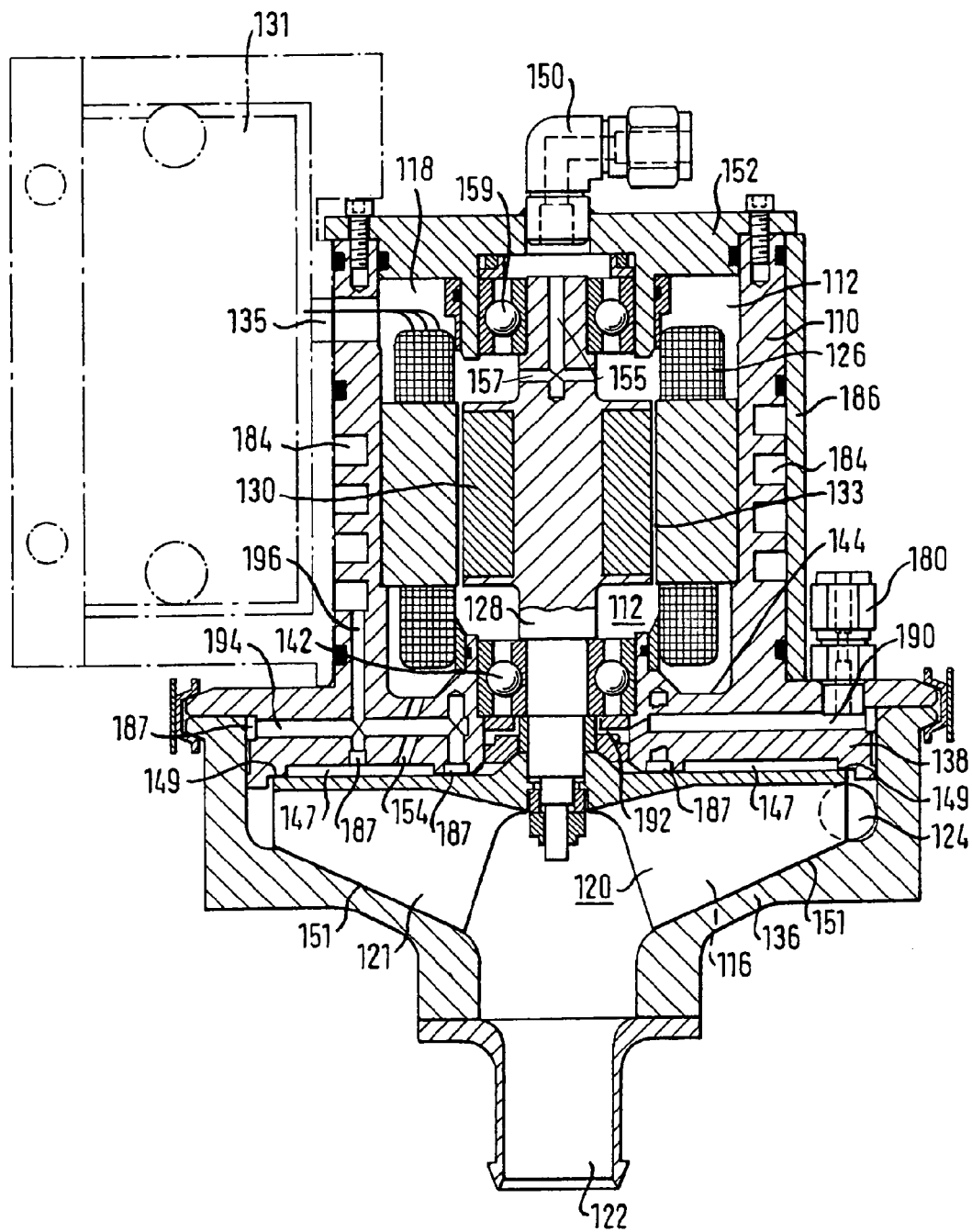
FIG. 4 represents a longitudinal section through a turbocompressor according to the invention which is used as a recirculation pump and has a scavenging gas inlet.

FIG. 4 now shows another compressor according to the invention in the form of a turbocompressor. The same reference numbers are used for parts corresponding to the parts in FIGS. 1, 2 and 3 in FIGS. 4 and 5. It goes without saying that the previous description is also valid for the parts of FIGS. 4 and 5 which are provided with the same numbers as the corresponding parts in FIGS. 1, 2 and 3 unless otherwise stated.

The basic design of a turbocompressor is well known. The turbocompressor 56 has a motor space 112 arranged inside a housing 110, a conveyer space 116 arranged at one end 114 of the housing and a connections space 118 arranged at the other end of the housing. The conveyer space 116 contains a rotor 120, which draws the gaseous fuel through a tubular inlet 122, causes an increase in the pressure of the gaseous fuel and delivers it subsequently through an outlet 124 to the anode sides of the fuel cells. In the motor space 112 a stator 126 is arranged in the housing and a rotor 130 is also provided, mounted on a drive shaft 128, the drive shaft 128 driving the rotor 120 and in the connections space 118 electrical connections (not shown) are installed. A controller 131 for the motor consisting of stator 126 and rotor 130 is affixed in this example to the housing 110 and, in the region 135 where the electrical connecting cables pass through, seals them hermetically. The atmosphere present in the anode cycle can therefore not pass into the controller. The controller, however, can also be arranged in the connections space as shown in FIG. 5.

Figure 5:
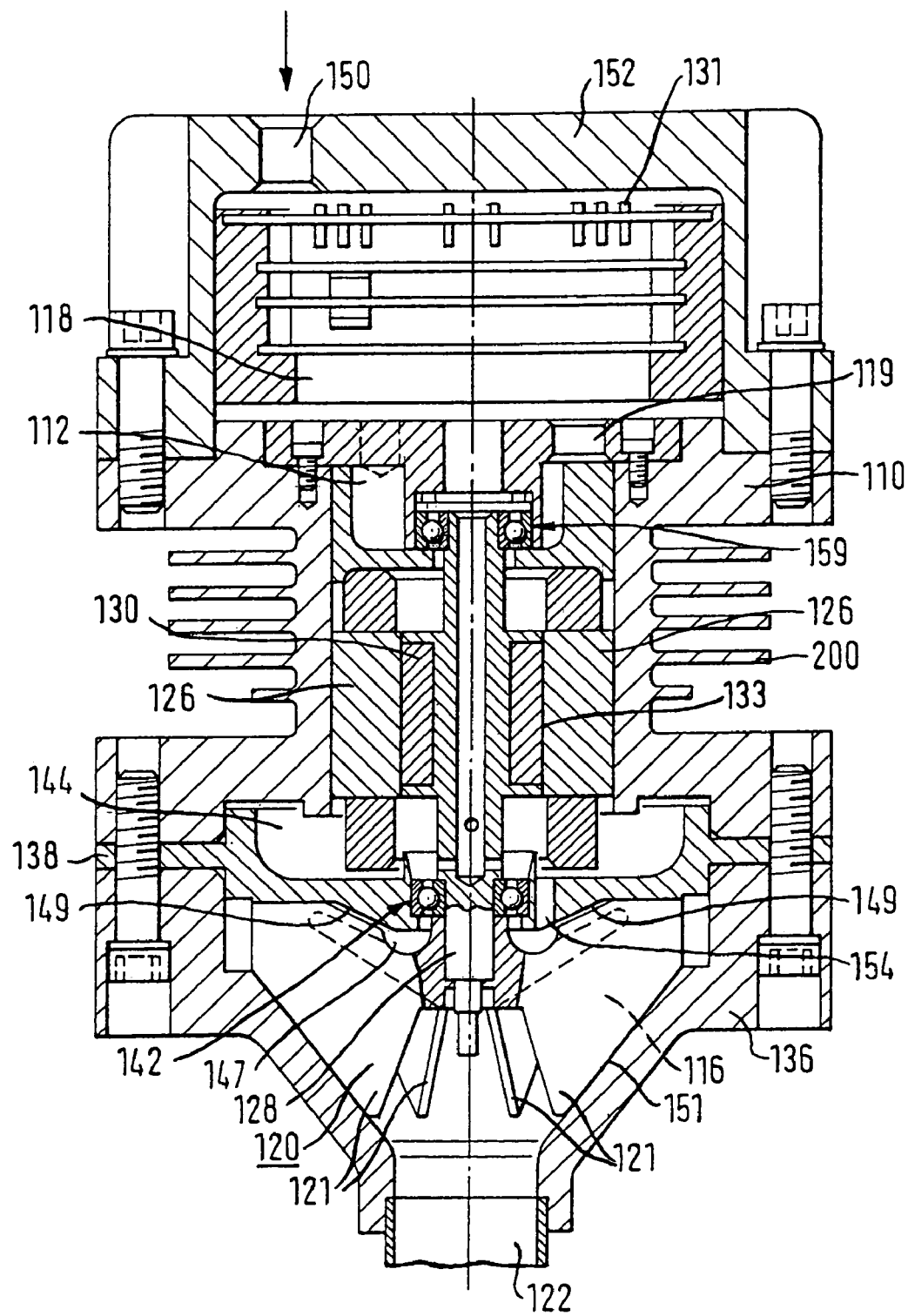
FIG. 5 is an alternative representation of a turbocompressor according to the invention with gas cooling instead of liquid cooling in a representation corresponding to FIG. 4

The electrical connections to the controller 131 are not shown in FIG. 5, current is supplied to the controller, however, via a plug connection, this plug connection is designed as a so-called mil plug and assures a hermetic seal between the inner space of the turbocompressor and the outer atmosphere. The exact details of the motor are not described here since they do not belong to the invention. It goes without saying, however, that the electric motor can be constructed according to any conventional model.

As a result of the system a pump as is shown in FIGS. 4 and 5 like the turbocompressor 56 has small gaps between the different components. For example, between the rotor 130 and the stator 120 there is a small air gap 133 which should probably be kept small in order to achieve a high efficiency of the motor. This means that the rotor 130 fits closely in the stator packet of the stator 126.

Also the rotor 120 with blades 121 fits closely against the surrounding lids 136 and 138 which bound the conveyer space 116 so that in these places other narrow functional gaps 149 and 151 are present between stationary parts (lids 138 and 136) and a moving part, here the rotor 120. As a result of the design, in the lid 136 and around the bearing 142 a groove 144 is formed below the motor. Because of the groove, in the previous design water will collect in the motor space. In addition condensate and the liquid water, which occurs when the motor is switched off, remain in all of the narrow gaps envisioned or addressed.

The design of the turbocompressor 56 as previously described corresponds to the earlier known construction of a turbocompressor. According to the invention, however, it is so modified that a scavenging gas inlet 150 is provided in the lid 152 which surrounds the connections space 118 and seals it against the outside environment. The scavenging gas which is supplied through conduit 84 is fed through the scavenging gas inlet 150, in contrast to the version shown in FIGS. 2 and 3, through borings 155 and 157 in the shaft 128 into the connections space 118. This design can optionally also be used for the construction in FIGS. 2 and 3. If desired, in all examples of embodiment the scavenging gaseous stream can be guided into the connections space through the bearing 159.

The scavenging gas then flows to the motor space 112, above all through the functional gap 133 and drives the condensate and water vapor out of these regions. In addition a boring 154 is provided in the bearing cover 138 which extends from the groove 144 into the annular hollow space 147. The scavenging gas then flows from the annular hollow space through the functional gap 149 located between the lid 138 and the rotor 120 into the conveyer space 116.

Part of the scavenging gas can, if necessary, flow through the bearing 142 and subsequently it can escape through the hollow space 147 of the functional gap 149 as long as the bearing 142 is not sealed hermetically against the motor space and the conveyer space. These variants are also applicable for the side channel compressor 56 and 52 and 53.

The water vapor and liquid water can subsequently leave the turbocompressor from the conveyer space via outlet 124. It is possible to install the pipe 164 with the U-curve 166, the drain line 170 and the valves 172, 174 per FIG. 2 on the outlet 124 of the designs in FIGS. 4 and 5. It is also possible to install the draining devices 170, 172 and 174 at the inlet 122. This is advantageous since the water also flows by utilizing the gradient of the conveyer space 116 and the effect of gravity toward the lowest point of the vertically arranged turbocompressor. In this case it is advisable to arrange another closable valve after the outlet 124 so that the displaced water can be removed through the drain line. The other valve can subsequently be reopened in order to scavenge the anode cycle.

The water or water vapor will then be completely removed from the anode cycle by means of the scavenging gas via the anode cycle and the drain valve 60. As stated above, this is not absolutely necessary if the anode cycle is provided with a water absorbing coating, which serves to absorb the water driven out of the side channel compressor 56.

Therefore, all of the water or water vapor is driven out of the turbocompressor or evaporated by an evaporation process also achieved by the scavenging gas and expelled so that no moisture remains in the turbocompressor which could lead to the freezing up of the turbocompressor at negative temperatures.

In addition, it should be pointed out that the turbocompressor according to FIG. 4 has a water cooling system. The inlet 160 for the cooling water is shown in FIG. 4 on the right side of the housing 110. The cooling water first flows into the bearing cover 138 and from there through borings 190, 192, 194 and 196 into the annular space 184 which extends around the motor housing and is formed by the outer contour of the housing 110 and the annular sleeve 186. The ends of the borings which must be closed are provided with stoppers, e.g., screw plugs 187. The cooling water also serves to cool controller 131 and then flows into the annular space 184 through cooling passages in the controller 131. The water outlet here is not shown but can be installed, e.g., on the housing of the controller.

FIGS. 4 and 5 additionally show how the turbocompressor is constructed, i.e., where the bearings and gaskets as well as the screws are seated which connect the individual housing parts and covers to each other and to the other components.

Instead of water cooling it is also conceivable to provide the turbocompressor with air cooling as is shown in FIG. 5. This air cooling is achieved in the simplest case by providing the housing 110 in the region of the annular space 184 where the water cooling in FIG. 2 is shown, with annular vanes 200, in which case the jacket 186 in FIG. 4 is omitted. If necessary a cooling blower or other device providing a cooling airstream can be used for this in order to carry heat away from the side channel compressor.

In contrast to the design in FIG. 4, in the version in FIG. 5 the controller 131 is not installed outside of the connections space 118 but rather inside it, which is also possible in the case of the side channel compressor in FIGS. 2 and 3. In this case the scavenging gas delivered through the scavenging gas inlet 150 also has the purpose of displacing or drying out any moisture present in the region of the controller.

Figure 6:
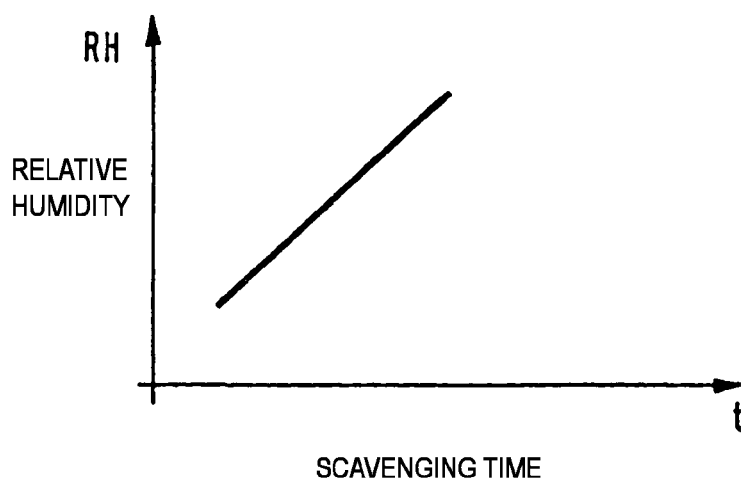
FIG. 6 is a graph representing the calculation of the scavenging time.

Finally FIG. 6 shows a curve which represents the scavenging time t as a function of the relative humidity RH present in the system. If there is more water in the system and therefore in the pump 56, the scavenging is performed for a longer time. By determining the characteristic line in FIG. 6, it is possible to determine and also regulate the scavenging time or the after-running time after the recirculation pump 56 is shut down. The moisture present, for example, can be determined by the moisture sensor 98, and with the knowledge of the volume present to be dried, the running time of the scavenging can be determined. This means a family of characteristic lines such as is shown in FIG. 6 can be stored in the memory 22 and then can be referred to for determining the scavenging time with knowledge of the relative humidity present. The scavenging time can also be supplement by an additional amount in order to make certain that the moisture is sufficiently removed.

As described above, it is not necessary to carry out the scavenging process if no temperatures below the freezing point are to be expected during the time until the next start-up of the vehicle. For example, such a scavenging process is unnecessary in the summer.

This time interval can optionally be input by the driver manually into the control system. If the car is used every day, for example, then 24 hours can be input as the time interval.

Since the control 22 receives the outside ambient temperatures through the temperature sensor 102 and if the computer has an internal clock as is usual, a data bank can be built up in a corresponding memory (not shown) in which the lowest temperatures over several days are stored and in this way it can predict with relatively good reliability if and when temperatures are to be expected within the next 24 hours that lie below the zero point. Instead of choosing the zero point, for example, one can choose 5° C. as the lowest permissible temperature so that for temperatures which lie below 5° C. the gas scavenging would be switched on in order to make certain that the system does not freeze up during the time interval in question.

Another operating mode would be to carry out a scavenging process only when the temperature sensor 102 indicates a critical temperature at which even lower temperatures are to be expected. For example, if the ambient temperature drops below 5° C. or below 3° C. then a scavenging could be performed long after the switching off of the fuel cell system in order to prevent the risk of freezing. This variant has the advantage that it is not necessary to input a time interval and therefore the risk of the incorrect estimation of the time interval or of the anticipated temperature does not exist.

Further, the possibility exists of introducing a meteorological service system, in which case the signals are sent out at regular time intervals which specify for the location in question when a temperature below the zero point is to be expected. Such signals can be received by the antenna 100 and can be checked in the control 22 whether the signal requires, with consideration of the present location of the vehicle and the time of the next switching off or after the last switching off, that a scavenging process be carried out. The location of the vehicle can be determined by a GPS system which is often installed anyway in modern motor vehicles, e.g., in connection with a built-in navigation system. The transmitter and the receiver of the navigation system can even be used for this purpose and the meteorological system can be processed by the navigation system. Here also the possibility exists either of performing a scavenging process at the same time when the fuel cell system is switched off or afterward when the meteorological signal indicates that this makes sense within the time interval determined in advance, or the scavenging process could be delayed until a meteorological signal shows that in a short time one can expect temperatures below the zero point. This procedure also would have the advantage that there would no longer be a necessity of considering a time interval. Such a system would also have the advantage that if the vehicle was restarted before the scavenging process is necessary the scavenging process and the related expenditure of energy or scavenging gas could be saved. In this case the system for executing the scavenging process would be reset, and only upon or after the next stopping process would there be a check as to whether a scavenging process is necessary on the basis of the meteorological signals. In this way many scavenging processes will be saved.

Although in the usual case it is necessary at least to scavenge the motor space and the conveyer space with scavenging gas in order to remove water from these areas it would finally be conceivable to scavenge only the conveyer space and the related functional gaps if one succeeds in achieving a hermetic seal between the motor and the conveyer space or if the conveyer space of a pump is powered by freshly delivered fuel such as is known, for example, from DE 101 61 521.3.

The invention claimed is:

1. Fuel cell system with several fuel cells assembled to form a fuel cell stack which has an anode side, a cathode side and a membrane arranged between the anode side and the cathode side, the anode sides of the fuel cells being connected to form an anode cycle, which additionally includes a feeding device for fresh gaseous fuel, a drain valve for continuous or discontinuous discharging of at least part of the gases flowing in the anode cycle as well as a component having at least one movable part and having spaces therein, the component returning at least a portion of the exhaust gases emerging from the anode side of the fuel cells to the anode sides of the fuel cells, and a scavenging gas inlet, arranged to supply dry compressed air to the component and deliver it through the spaces in order to expel and/or dry out water, an air compressor which delivers compressed air to the cathode sides of the fuel cells and a connecting line from the air compressor to the scavenging gas inlet.

2. Fuel cell system according to claim 1, wherein an air dryer is provided between the air compressor and the scavenging gas inlet.

3. Fuel cell system according to claim 1, wherein a valve is provided in the connecting line which valve is connected to a control in which the opening time of the valve and/or the flow opening of the valve are determined.

4. Fuel cell system according to claim 1, wherein a check valve is installed in the connecting line.

5. Fuel cell system according to claim 1 wherein a device is provided which governs the supply of the dry compressed air.

6. Fuel cell system according to claim 5, wherein the device is designed in such a way as to allow for the quantity of water to be driven out and/or dried when governing the feed of the dry compressed air.

7. Fuel cell system according to claim 5, further comprising an outside temperature sensor, the outside temperature sensor being coordinated with the device.

8. Fuel cell system according to claim 5 wherein the device is designed for controlling the feed of compressed air so as to deliver compressed air only when temperatures are anticipated which permit a possible freezing of the component to be expected.

9. Fuel cell system according to claim 5, wherein the device governing the feed of dry compressed air is coordinated with a device registering the historical curve of the ambient temperature in a time interval preceding the present switching off of the fuel cell system.

10. Fuel cell system according to claim 9, wherein the device registering the historical curve of the ambient temperature includes at least one temperature sensor, a timer and a storage memory for the time-dependent storage of the temperature that is measured by the temperature sensor.

11. Fuel cell system according to claim 9, wherein an inputting device is provided with which the time interval following the switching off of the fuel cell system can be inputted.

12. Fuel cell system according to claim 8, wherein the device governing the feed of the dry compressed air has a part for receiving a meteorological signal which serves to activate the device.

13. Fuel cell system according to claim 5 wherein the device for governing the feed of the dry compressed air permits the compressed air to be supplied only when the fuel cell system is switched off.

14. Fuel cell system according to claim 1, wherein the component is a compressor.

15. Fuel cell system according to claim 14 in which the compressor has a motor space arranged inside a housing, a conveyer space arranged at the end of the housing and a connections space arranged at the other end of the housing, the conveyer space containing a rotor, which draws gaseous fuel through an inlet, raises the pressure of the gaseous fuel, and supplies it subsequently through an outlet to the anode sides of the fuel cells, a stator arranged in the motor space in the housing and a rotor arranged on a drive shaft the drive shaft driving the rotor and in the connections space the electrical connections, wherein the scavenging gas inlet is provided in the connections space, and compressed air is fed into the connections space, the compressed air subsequently flowing into the motor space between the rotor and the stator and past the rotor and stator and subsequently enters into the conveyer space and there scavenges gaps between the rotor and the housing surrounding the rotor.

16. Fuel cell system according to claim 14, wherein after passing through the gaps, the dry compressed air leaves the conveyer space through the outlet.

17. Fuel cell system according to claim 14, wherein the dry compressed air after leaving the outlet flows through the anode cycle and exits from the drain valve.

18. Fuel cell system according to claim 14 wherein a bearing cover arranged between the rotor and the rotor wheel coordinated with the compressor housing is provided with a boring which guides the compressed air into the conveyer space or the housing surrounding it where it flows through the gaps.

19. Fuel cell system according to claim 14 wherein a motor controller is provided in the connections space and can also be scavenged with compressed air before it flows on into the motor space.

20. Fuel cell system according to claim 14 wherein the connections space is equipped with a gastight electric plug-in connection.

21. Fuel cell system according to claim 14 wherein the compressor with the drive shaft is arranged generally vertically and with the inlet to the conveyer space below it.

22. Fuel cell system according to claim 14 wherein the compressor is water or air cooled.

23. Fuel cell system according to claim 13 wherein all surfaces of the compressor which come into contact with condensing water vapor or water are arranged for drainage of the water.

24. Fuel cell system according to claim 13 wherein the compressor is a side channel compressor.

25. Fuel cell system according to claim 13 wherein the compressor is a turbocompressor.

26. Fuel cell system according to claim 1 wherein the component is a pump having an, a water collecting device is provided at the outlet, the system further comprising a drain line, a first valve in the water collecting device and a second valve on a downstream side of the water collecting device, said second valve in an open first valve open and with feeding of a compressed air the water collected in the water collecting device can be drained out through the drain line.

27. Fuel cell system according to claim 1 wherein the component is a pump having an inlet, a water collecting device is provided at the inlet, the system further comprising, a drain line, a first valve in the water collecting device and a second valve on the downstream side of the water collecting device, the second valve in an open state permitting a flow into inlet of the pump, and in a closed state and with the first valve open and with feeding of a compressed air the water collected in the water collecting device can be discharged through the drain line.

28. Fuel cell system according to claim 26, wherein another valve is coordinated with the outlet of the pump in which case the normally open other valve can be closed when water is discharged from the drain line.

* * * * *